(12) United States Patent
Priborsky

(10) Patent No.: US 6,883,079 B1
(45) Date of Patent: Apr. 19, 2005

(54) METHOD AND APPARATUS FOR USING DATA COMPRESSION AS A MEANS OF INCREASING BUFFER BANDWIDTH

(75) Inventor: Anthony L. Priborsky, Lyons, CO (US)

(73) Assignee: Maxtor Corporation, Longmont, CO (US)

( * ) Notice: Subject to any disclaimer, the term of this patent is extended or adjusted under 35 U.S.C. 154(b) by 102 days.

(21) Appl. No.: 09/942,427

(22) Filed: Aug. 29, 2001

Related U.S. Application Data
(60) Provisional application No. 60/229,924, filed on Sep. 1, 2000.

(51) Int. Cl.[7] .............................................. G06F 12/02
(52) U.S. Cl. ....................... 711/170; 711/104; 711/105; 711/154; 709/247
(58) Field of Search ............................... 711/104, 170; 709/247; 710/68

(56) References Cited

U.S. PATENT DOCUMENTS

| | | | |
|---|---|---|---|
| 5,159,336 A | 10/1992 | Rabin et al. .................. | 341/51 |
| 5,357,614 A | 10/1994 | Pattisam et al. ............ | 395/250 |
| 5,454,076 A | 9/1995 | Cain et al. ................... | 395/164 |
| 5,898,833 A | 4/1999 | Kidder ................... | 395/200.64 |
| 5,974,471 A * | 10/1999 | Belt ............................... | 710/1 |
| 5,987,627 A | 11/1999 | Rawlings, III ............... | 714/48 |
| 6,170,047 B1 | 1/2001 | Dye .......................... | 711/170 |
| 6,173,381 B1 * | 1/2001 | Dye .......................... | 711/170 |
| 6,370,631 B1 * | 4/2002 | Dye .......................... | 711/170 |
| 6,452,602 B1 * | 9/2002 | Morein ....................... | 345/555 |
| 6,523,102 B1 * | 2/2003 | Dye et al. .................. | 711/170 |

\* cited by examiner

*Primary Examiner*—A. Elamin
(74) *Attorney, Agent, or Firm*—Tejpal S. Hansra

(57) ABSTRACT

A method and apparatus for increasing the bandwidth of a memory controller system are provided. According to the invention, data received at an interface of a memory controller system is compressed in the memory controller by a compression engine for storage in associated memory. The address of the data written to memory is maintained in a memory controller. When data is read from the memory for provision to an interface of the memory controller, the memory manager retrieves the data from memory and provides it to a decompression engine. The decompression engine restores the data to its original, uncompressed form. The data is then provided to the appropriate interface.

43 Claims, 2 Drawing Sheets

METHOD AND APPARATUS FOR USING DATA COMPRESSION AS A MEANS OF INCREASING BUFFER BANDWIDTH

CROSS REFERENCE TO RELATED APPLICATIONS

Priority is claimed from U.S. Provisional Patent Application Ser. No. 60/229,924 filed Sep. 1, 2000, entitled "USING DATA COMPRESSION AS A MEANS OF INCREASING EFFECTIVE BUFFER BANDWIDTH" the disclosure of which is incorporated herein by reference in its entirety.

FIELD OF THE INVENTION

The present invention relates to computer memory controllers. In particular, the present invention relates to increasing the effective bandwidth of disk drive controllers using data compression.

BACKGROUND OF THE INVENTION

Memory controllers are a common feature in connection with computing devices. Among the functions of memory controllers are interface timing, refresh generation, arbitration and access to a memory component. Memory controllers may also allocate and control access to memory provided for the purpose of buffering data or as a data cache in connection with exchanges of data between a first interface or channel and a second interface or channel.

As the clock speeds of computer processors and data busses have increased, the need for fast external memory has also increased. However, the speed of such memory has been unable to keep pace with increases in the speed of computer processors and data busses. For example, commonly available bulk memory has data rates of 100 or 133 Megabytes per second, while processors, and other components within a typical computer have data rates of 200 Megabytes per second or more. Accordingly, external memory used to buffer data or as a data cache has become an increasingly large impediment to increased computer peripheral performance.

Although certain types of memory, such as SRAM, is capable of providing memory bandwidths that are closely matched to that of high speed processors, such memory is typically provided as an integral part of an associated processor. In addition, such memory is typically relatively small in capacity. Furthermore, such memory is generally considered prohibitively expensive to provide in the quantities required by a typical external memory application.

One approach to increasing the bandwidth of memory is to use memory having a data bus width that is greater than the width of the bus or busses interconnected to the memory. However, this approach results in increased cost and complexity, and can result in memory chips having an unacceptably large number of pins.

Memory controllers that include data compression and decompression engines and that allow data to be saved in compressed or uncompressed formats in the system memory are known. Such systems allow data to be passed among components of the system in compressed form, thereby decreasing the amount of time required to transfer the data. Such a system is discussed in U.S. Pat. No. 6,173,381 (the "'381 patent"). However, the '381 patent does not disclose a method and apparatus for increasing the data throughput performance of a memory controller that does not require modifications to the host computer system. Instead, the '381 patent discusses compressing data to improve the efficiency with which that data is moved around the associated system. Accordingly, in connection with providing compressed data to a hard drive or other storage device, the '381 patent contemplates transferring that data in compressed form and storing the data on the storage device without first decompressing the data. Furthermore, the '381 patent does not contemplate decompressing all compressed data read from memory associated with a disk drive controller before that data is provided to a system bus. Instead, the '381 patent discusses transferring over a system bus compressed data read from a disk drive in compressed form without first decompressing that data. Therefore, according to the '381 patent, the host system must be capable of compressing and decompressing data. In the case of storing raw uncompressed data to a storage device using interchangeable media, for example, removable disk cartridges, the '381 patent requires that all hosts must have the ability to decompress data and to differentiate compressed from uncompressed data.

For the above-stated reasons, it would be desirable to provide a method and apparatus for improving the apparent bandwidth of memory used in connection with a memory controller. In addition, it would be advantageous to provide a method and apparatus capable of increasing the apparent bandwidth of memory as compared to the bandwidth exhibited by such memory when used without the method and apparatus of the present invention, and that did not require modifications to the host system. Furthermore, it would be advantageous to provide a method and apparatus for increasing the apparent bandwidth of memory that could be implemented within an application specific integrated circuit (ASIC) or as part of the firmware of a microprocessor. In addition, it would be advantageous to provide such a method and apparatus that are reliable in operation and that are relatively inexpensive to implement.

SUMMARY OF THE INVENTION

In accordance with the present invention, a method and an apparatus for increasing the effective bandwidth of memory in a device controller are provided. The present invention generally allows memory to provide an increased apparent or effective bandwidth. In particular, the method and apparatus of the present invention increase the effective or apparent bandwidth of the memory by providing a controller that compresses data before or while that data is written to the memory. When the compressed data is read from the memory, the controller decompresses that data before providing it in its original form to a consumer of the data.

According to one embodiment of the present invention, a method is provided for increasing the effective bandwidth of memory associated with a device controller. According to the method, a block of data is received from a producer of data at a controller associated with the memory. The controller compresses the data, and writes the compressed data to the memory. Because the size of the data block is reduced by the compression of the data, a smaller amount of data is written to the memory than would otherwise be the case. Accordingly, the apparent bandwidth of the memory is increased during the write operation. When a consumer of data is ready to receive the compressed data, or when the consumer of data otherwise requests the compressed data, the compressed data is read from the memory. Again, because of the size of data block is decreased as compared to its original, uncompressed form, a smaller amount of data must be read from the memory than would be the case if the data block had not been compressed. Accordingly, the apparent bandwidth of the memory is increased during the read operation. The data is then decompressed by the controller before being provided in its original, uncompressed form, to the data consumer.

In accordance with a further embodiment of the present invention, a memory manager determines whether the received data cannot be compressed. For example, the memory manager determines whether the compression operation resulted in an expansion of the size of the data block, rather than a decrease in the size of the data block. If the compression operation resulted in an increase in the size of the data block, which would increase the amount of memory required to store the data (i.e., the data is pathological), the data is written to memory in uncompressed form. With respect to data written to memory in uncompressed form, the memory controller generates a flag or otherwise causes an interrupt to allow an attribute to be set indicating that the data is not compressed.

In accordance with another embodiment of the present invention, a memory controller for use in connection with a computer storage device that is capable of increasing the effective bandwidth of associated memory is provided. The memory controller provides at least one interface for receiving or sending data. The memory controller further provides a data compression engine for compressing data received at the interface. Associated with or integral to the memory controller is memory, such as an SDRAM buffer or cache. Data received from a data producer or source is compressed by the data compression engine and is stored in the memory by a memory manager. When data stored in the memory is required at an interface of the memory controller, it is read from the memory by the memory manager, and expanded to its original form by a data decompression engine. The uncompressed data is then available to the interface interconnected to the data consumer. Because compression of the data received from a data producer at the interface results in fewer bytes of information that must be written to and read from the memory, the effective bandwidth of the memory is increased. Furthermore, because the data compression and decompression engine or engines are capable of compressing and decompressing data faster than it can be stored in the memory, the overall bandwidth of the memory controller is increased as compared to a conventional memory controller. Additional advantages of the present invention will become readily apparent from the following discussion, particularly when taken together with the accompanying drawings.

DETAILED DESCRIPTION

Figure 1:
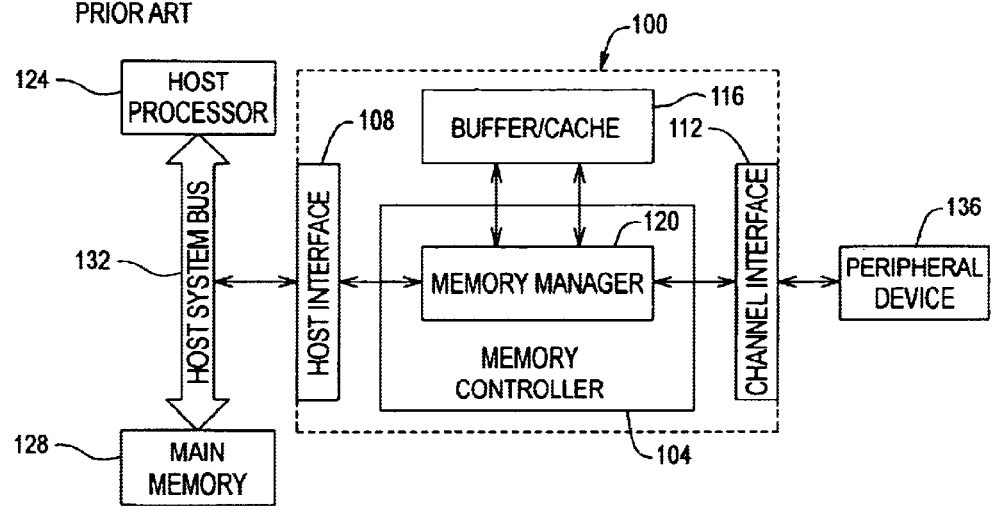
FIG. 1 is a block diagram depicting components of a memory controller system in accordance with the prior art.

With reference now to FIG. 1, a memory controller system 100 in accordance with the prior art is illustrated. The conventional memory controller system 100 generally includes a memory controller 104, a first or host interface 108, a second or channel interface 112, and memory 116. In addition, the memory controller 104 may include a memory manager 120. In a typical implementation of a conventional memory controller system 100, the first interface is interconnected to a host processor 124 and to main memory 128 through a system bus 132, and the second interface 112 is interconnected to a peripheral device 136.

In operation, the conventional memory controller system 100 receives data at one of the first or second interfaces 108 or 112 for transfer to the other of the first or second interfaces 108 or 112. If the consumer of the data or the interface 108 or 112 through which the consumer of data is interconnected to the conventional memory controller 104 is not ready to receive that data, or if it is determined that the data should be cached, the memory manager 120 writes the data to the memory 116.

In a typical memory controller 104, the bandwidth of the memory 116 limits the bandwidth of the first and second interfaces 108 or 112, the memory manager 120, or the bandwidth of processors or other devices interconnected to the controller 104 through the first and second interfaces 108 and 112. Therefore, data often cannot be written to or read from the memory 116 as fast as it can be received from or provided to devices interconnected to the memory controller 104 through the first and second interfaces 108 and 112. Therefore, the interfaces 108 and 112 and devices interconnected to the interfaces 108 and 112 sometimes must wait while data is written to or read from the memory 116. For example, when the data written to the memory 116 is passed to a consumer of that data, the relatively low bandwidth of the memory 116 can result in data being passed to the consumer at a rate that is lower than the bandwidth at which the typical consumer or interface 108 or 112 is capable of receiving or passing that data. Therefore, the bandwidth or data rate of the memory 116 ultimately determines the bandwidth of the memory control system 100.

Figure 2:
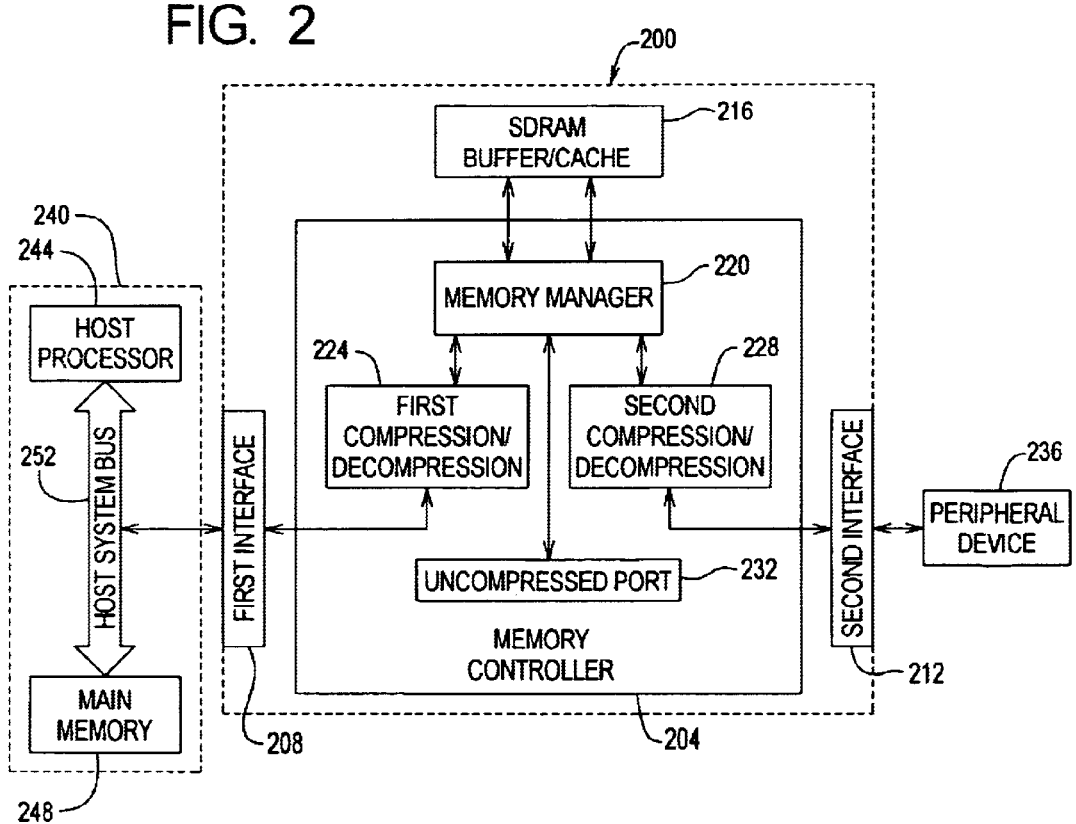
FIG. 2 is a block diagram depicting components of a memory controller system in accordance with an embodiment of the present invention.

With reference now to FIG. 2, a memory controller system 200 in accordance with an embodiment of the present invention is depicted. In general, the memory controller system 200 includes a memory controller 204, a first or host interface 208, a second or channel interface 212, and a memory 216. The memory controller 204 may include a memory manager 220, a first compression/decompression block or engine 224, and a second compression/decompression block or engine 228. In addition, the memory controller 204 may include an uncompressed memory port 232. In accordance with the embodiment illustrated in FIG. 2, the memory controller 204 is part of a memory controller system 200 interconnecting a peripheral device 236 to a host system 240.

In a typical application, the memory controller system 200 of the present invention is provided as part of a peripheral device 236, such as a computer storage device. For example, the memory controller system 200 may be provided as part of a hard disk drive, a tape drive, an optical storage device, or any other type of bulk storage device. In addition, the memory controller system 200 may be provided as part of a redundant array of independent (or inexpensive) disks (RAID), or as a bridge between data busses.

According to one embodiment of the present invention, the memory controller 204 is implemented as part of the memory controller system 200 in an ASIC controller included as part of a hard disk drive. The memory 216 is, according to one embodiment of the present invention, SDRAM. However, the memory 216 may include any type of memory, such as DRAM, SRAM, and RAM. Furthermore, the memory 216 may be external to other components of the memory controller system, or may be internal to another component. For example, the memory 216 may be internal to an application specific integrated circuit (ASIC) implementing the functional blocks or components of the memory controller.

The interfaces 208 and 212 are generally determined by the type of communication bus to be interfaced to the memory controller 204. For example, where the first interface 208 interconnects the memory controller 204 to a host processor 244 and/or main memory 248, provided as part of the host system 240 the first interface 208 will typically be required to communicate with a host system bus 252. The host system bus 252 may include a peripheral component interconnect (PCI) bus. The first interface 208 may include a PCI, small computer system interface (SCSI), fiber channel, advanced technology attachment (ATA), serial ATA (SATA) or other interface to a communication bus. The second interface 212 may likewise include an SCSI, fiber channel, ATA, SATA, or other interface to a communication bus. Accordingly, it can be appreciated that the memory controller system 200 may be used to interconnect the communication busses of two different host systems, or to interconnect a host system to a peripheral device 248 or devices. Where the memory controller system 200 is implemented as part of a peripheral device 248 itself, such as a hard disk drive, the first 208 and/or second interface 212 may include the channel of the device. For example, where the memory controller system 200 is part of a hard disk drive, the second interface 212 may interconnect the memory controller 204 directly to the read/write channel of the hard disk drive, while the first interface 208 may interconnect the memory controller 204 to a communication bus such as a host system bus 252.

The memory controller system 200 in accordance with an embodiment of the present invention may, like the conventional memory controller 100, utilize memory 216 having a rated bandwidth or data rate that is about equal to or slightly greater than the combined bandwidths or data rates of the first 208 and second 212 interfaces, and less than the bandwidth or data rate of the memory manager 220. In addition, the memory 216 has a bandwidth that is less than the bandwidth or data rate of the first 224 and second 228 compression/decompression blocks or engines. Furthermore, the memory 216 used in connection with a memory controller system 200 in accordance with the present invention may have the same nominal bandwidth as the memory 116 used in connection with a conventional memory system controller 100. However, the apparent bandwidth of the memory 216 provided in connection with an embodiment of the present invention is greater than the apparent bandwidth of the memory 116 associated with a conventional memory controller 100.

The memory controller 204 of the present invention increases the apparent bandwidth of the memory 216 because data is generally written to and read from the memory 216 in compressed form. Because the compression of data reduces the number of bits in a block of data, less bandwidth is required to store or retrieve a sequence of compressed data than is required to store or retrieve the same sequence of data in uncompressed form in a given amount of time. Alternatively, a given amount of data can be stored in or retrieved from the memory 216 associated with the memory controller 204 of the present invention in less time than that same amount of data can be stored in or retrieved from memory 116 having the same characteristics of memory 216 but associated with a conventional memory controller 104. Accordingly, by writing data to and reading data from the memory 216 in compressed form, the apparent bandwidth of the memory 216 is increased. In addition, because the bandwidth of the memory 116 in a conventional memory controller system 100 limits the data throughput performance (i.e. the bandwidth) of the controller system 100, a memory controller system 200 in accordance with the present invention that increases the apparent bandwidth of the memory 116 can provide improved bandwidth or data throughput performance. Accordingly, a memory controller system 200 in accordance with the present invention can utilize memory 216 having nominal performance characteristics that are identical to memory 116 used in connection with a conventional memory controller system 100, while providing an increased data rate. Alternatively, a memory controller system 200 in accordance with the present invention can use memory 216 having a lower rated bandwidth than a conventional memory controller 100, while providing a similar data rate.

Figure 3:
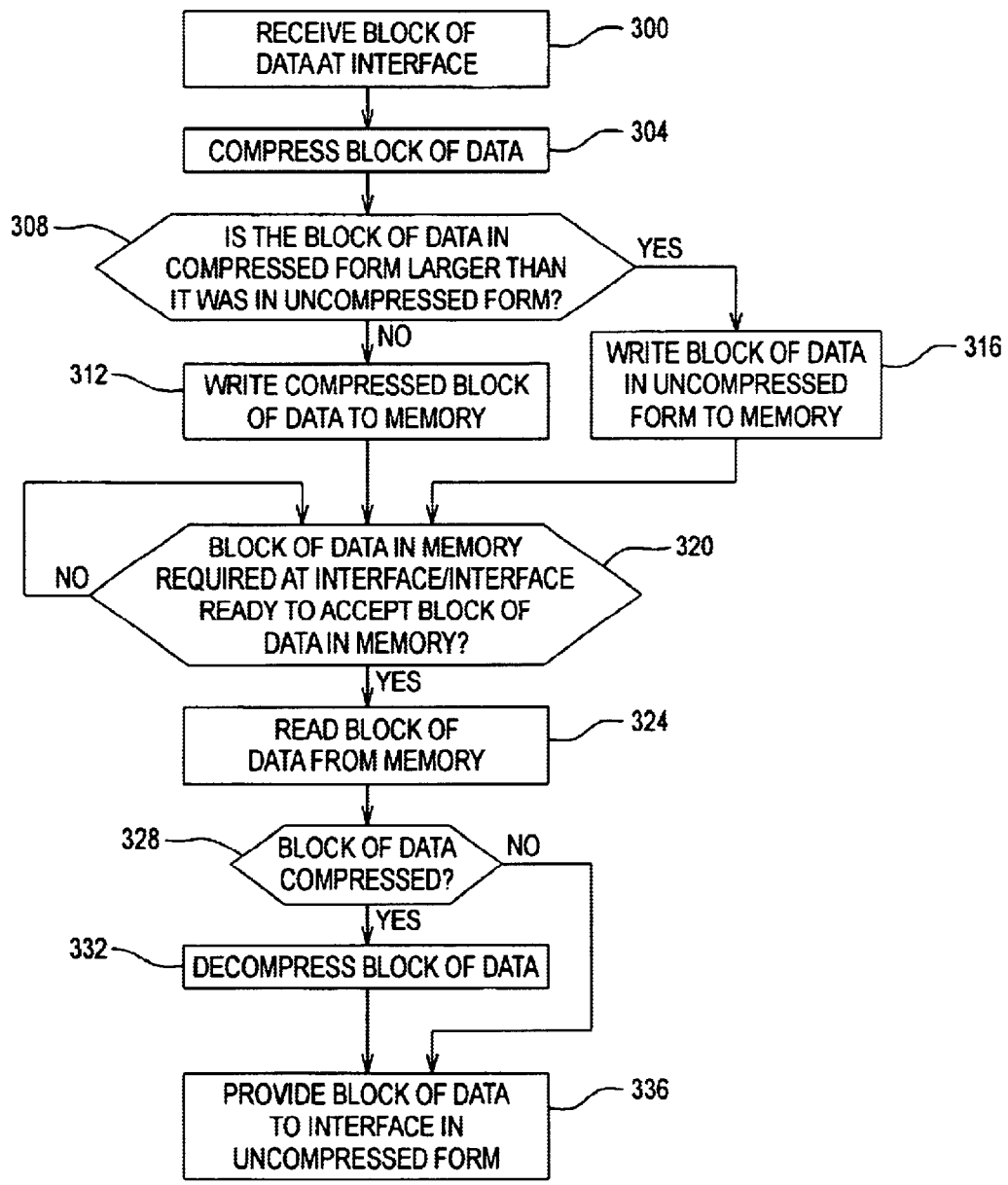
FIG. 3 is a flow chart illustrating the operation of an embodiment of a memory controller system in accordance with the present invention.

With reference now to FIG. 3, a flow chart illustrating an example of the operation of an embodiment of the present invention is illustrated. Initially, at step 300, a block of data is received at an interface 208 or 212. For purposes of the present example, it will be assumed that the data is received at the first interface 208 for storage on a hard disk drive (peripheral device 236) with which the memory controller 204 is integrated. Furthermore, it will be assumed that the source of the data is the host system 240. After being received at the first interface 208, the block of data is passed to the first compression/decompression engine 224, and the block of data is compressed (step 304).

The compressed block of data is then passed to the memory manager 220. The memory manager 220 determines whether the block of data is larger in compressed form than it was in its original, uncompressed form (step 308). If the data in compressed form is not larger than it was in its original, uncompressed form, the compressed block of data is written to the memory 216 (step 312). If at step 308 it is determined that the compression of the data actually resulted in an expansion of that data, it is written to the memory 216 in uncompressed form (step 316). Accordingly, it can be appreciated that the memory manager 220 detects pathological instances of data that cannot be compressed by the compression/decompression engines 224 and 228. Alternatively, the portion of the data expanded by the compression algorithm implemented by the compression/decompression engine 224 is written to the memory 216 in expanded form, and the remaining portion of the data is written to the memory 216 with being altered by the compression algorithm. As a further alternative, the expansion of the data can be ignored, and all of the data can be processed by the compression algorithm before it is written to the memory 216.

The data written to the memory 216 generally remains there until it is required at an interface 208 or 212 interconnected to a data consumer, or until the interface 208 or 212 interconnected to the consumer of data is ready to accept that data. Accordingly, it can be appreciated that the memory 216 may be used to buffer data, or as a data cache. Accordingly, at step 320, a determination is made as to whether the block of data in memory 216 is required at an interface 208 or 212, or whether an interface 208 or 212 is ready to accept all or a portion of data stored in memory 216. If no, the system 200 may idle at step 320. If yes, the block of data is read from the memory 216 (step 324).

At step 328, the block of data read from memory 216 is analyzed, for instance by the memory manager 220, to determine whether that data was compressed (step 328). Alternatively, the memory manager 220 may maintain a record of the data stored in memory 216 that includes an indication as to whether a particular portion of data written to the memory 216 has been compressed. The memory manager 220 may also be used to keep a record of the attributes, such as the address, compression status, (for example in the form of a compression flag), and length of data stored in the memory 216.

If the data read from memory 216 was compressed, that data is decompressed in the second compression/decompression engine 228 (step 332). The block of data, in its original, uncompressed form, is then provided to the second interface 212 for delivery to the intended data consumer (step 336). Thus, according to the present example, upon being provided to the second interface 212, the block of data is stored on the hard disk drive 236 with which the memory controller 204 is associated in uncompressed form.

If the block of data read from memory 216 was not compressed, no step of decompression is required. Instead, the data may be passed from the memory manager 220 to the second interface 212 for storage on the hard disk drive 236 (the data consumer in this example) without a step of decompression by the second compression/decompression engine 228. According to an embodiment of the present invention, a data compression flag is maintained by the memory manager 220 with respect to each block of data to indicate the compression status of the data. Therefore, depending on the status of the data compression flag, the memory manager can determine whether data should be decompressed in the second compression/decompression engine 228.

As can be appreciated by one of skill in the art, in connection with a read operation, the steps set forth in FIG. 3 are largely the same, except the data is received at the second interface 212 and passed to the first interface 208. Accordingly, data received at the second interface 212 is compressed in the second compression/decompression engine 228, and analyzed by the memory manager 220. If the memory manager 220 determines that the compression operation has in fact expanded the data, the data is written to the memory 216 in uncompressed form. Otherwise, the data is written to the memory 216 in compressed form. When the data is ready to be accepted at the first interface 208, or has been requested, the memory manager 220 determines whether the data read from the memory 216 was compressed. If the data was compressed, it is decompressed by the first compression/decompression engine 224 and passed to the first interface 208. Alternatively, if the data stored in memory 216 was not compressed, for example because the memory manager 220 determined that it was pathological and had in fact expanded during an earlier attempted compression operation, it is passed to the first interface 208 without further modification by the first compressions/decompression engine 224. Accordingly, it can be appreciated that data is passed from the first interface 208 of the memory controller system 200 in uncompressed form. Furthermore, from the above description, it can be appreciated that any data read from the memory 216 in compressed form is decompressed before it is provided to an interface 208 or 212 for delivery to a data consumer.

Although the examples given above generally describe transfers of data between a peripheral device 236 interconnected to the second interface 212 and a host system 240 interconnected to the first interface 208, the operation of the controller 204 of the present invention is not limited to such situations. For example, both the first 208 and second 212 interfaces may be interconnected to peripheral devices or busses. Furthermore, it should be appreciated that data received at a one of the interfaces 208 or 212 may be passed back to the same interface at which it was received, for example, in connection with a data cache operation.

It should be appreciated that additional operations may be performed with respect to data passed through the memory controller 204 of the present invention. For example, parity checking or error correction functions may be performed, such as when the memory controller 204 is implemented as part of a device controller, including a RAID controller. For instance, a cyclical redundancy check (CRC) operation may be performed with respect to data to provide parity or error correction information. Such parity or error correction information may be passed to a consumer of the data along with the data itself, or may be used for internal error detection or error correction purposes.

The uncompressed port 232 that may be provided as part of the memory controller 204 is generally used for internal functions. For example, the uncompressed port 232 may allow the processor implementing all or part of the memory controller 204 to access the memory 216. For instance, the memory controller 204 may store scratch data and other information generated in the memory 216 through the uncompressed port 232. According to another embodiment of the present invention, the uncompressed port 232 may be interconnected to one or both of the interfaces 208 or 212 when data compression and decompression are not desired.

In an embodiment of the memory controller system 200 provided in connection with a hard disk drive, the memory 216 may be about 4 Megabytes of SDRAM having a bandwidth of 100 Megabytes per second. The first interface 208 may comprise an ATA, SATA, or SCSI interface interconnecting the memory controller system 200 to the host system 240. The bandwidth of the host system may be about 100 Megabytes per second. The memory controller 204 may be implemented as part of an ASIC controller that is itself included as part of a hard disk drive. That is, the memory controller system 204 may be part of a peripheral device 136. The second interface 212 may thus interconnect the memory controller 204 to the read/write channel of the hard disk drive. Accordingly, the second or channel interface 212 may be a proprietary host or CPU interface used in connection with read/write operations to a disk included as part of the disk drive.

The application specific integrated circuit (ASIC) implementing the functions of the memory controller 204 may include a processor that is generally capable of running software, firmware or microcode implementing the compression/decompression blocks 224 and 228, the memory manager 220, and, if provided, the uncompressed port 232. In particular, the ASIC or processor implementing the memory controller 204 must be capable of compressing and decompressing data at a rate greater than the actual bandwidth of the memory 216.

The various components depicted in the memory controller 204 illustrate major functional aspects of the controller 204, and not necessarily discrete pieces of hardware. For example, it can be appreciated by one of skill in the art that the memory manager 220, the first 224 and second 228 compression/decompression engines, and the uncompressed port (i.e. the major functional components of the memory controller 204) may all be implemented as part of a suitable ASIC or programmable processor. Furthermore, it will be appreciated by one of skill in the art that various subcombinations of the functional components of the memory controller 204 may be embodied in separate programmable processors or in a combination of one or more programmable processors and one or more hardware engines. For example, the compression/decompression engines 224 and 228 may be implemented as hardware compression and decompression engines. As a further example, a single hardware compression engine may be provided to perform the compression function of both bock 224 and block 228. Similarly, a single hardware decompression engine may be provided to perform the decompression functions of both block 224 and block 228. Hardware engines used to implement the compression/decompression blocks 224 and 228 must be capable of compressing and decompressing data at a rate greater than the actual bandwidth of the memory 216.

It should be appreciated that the memory manager 220 may perform a variety of functions. For example, as explained above, the memory manager 220 can determine whether data is capable of being compressed. In addition, the memory manager 220 can maintain a record of the data stored in memory 216 to allow the efficient retrieval of all or portions of that data in response to a request for such data. The memory manager 220 may also control the reading and decompression of data to a temporary data buffer in response to a request for random access to the compressed data received at an interface 208 or 212.

The compression/decompression blocks 224 and 228, as can be appreciated by one of ordinary skill in the art, may be implemented using a single compression and complimentary decompression routine. Any lossless compression algorithm may be used. In accordance with one embodiment of the present invention, the Lempel-Ziv-Welch (LZW) algorithm is used. In general, a compression algorithm is suitable for use in connection with the memory controller 204 of the present invention so long as it is capable of performing compression and subsequent decompression of data without loss of information.

As can be appreciated by the above description, in normal operation the memory controller 204 compresses all data received at either of the first 208 or second 212 interfaces. Provided that the data is not pathological, and has not been expanded by the compression algorithm, it is stored in the memory 216 in compressed form. Furthermore, it can be appreciated that data is passed from the memory controller system 200 in uncompressed form. Accordingly, data stored in memory 216 in compressed format is decompressed prior to being passed to a consumer of that data, such as a host processor 244 or a peripheral device 236. Therefore, it can be appreciated that the memory controller 204 of the present invention is capable of providing increased data throughput as compared to a conventional memory controller having memory with a comparable bandwidth. For example, if a 2:1 compression ratio is achieved by the first 224 and second 228 compression/decompression blocks, the amount of data that must be stored in the memory 216 is, including overhead, about half as much as the amount of data that would have to be stored in the memory 216 without data compression. Accordingly, the time required to write the compressed block of data to the memory 216 and to retrieve that data from the memory 216 is about half what it would be if the data were not compressed. In addition, it should be appreciated that the memory controller 204 of the present invention does not increase the absolute memory bandwidth of the system bus 252, or any other bus, interconnected to the memory controller system 200.

Also, it can be appreciated that the memory controller system 200 of the present invention is transparent to any associated host processor 244. Therefore, the memory controller system 200 of the present invention can be implemented in connection with conventional host systems 240 to provide increased data throughput, for example, to and from a peripheral device 236, such as a hard disk drive, without requiring host processor 244 resources or modification to the host system 240. Furthermore, it can be appreciated that the memory controller system 200 may be provided as an integral part of a peripheral device 236, such as a hard disk drive or other mass storage device. In addition, the memory controller system 200 of the present invention may be implemented as part of RAID controller.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method, usable in a computer system having host system memory, for increasing the data throughput performance of a memory controller, said memory controller being associated with controller memory, different from said host system memory, comprising:
   receiving data from a source;
   compressing said data;
   storing said data in said controller memory, wherein said controller memory is one of SDRAM, DRAM, SRAM or RAM;
   reading said data from said memory;
   decompressing said data; and
   providing said data to a data consumer.

2. The method of claim 1, wherein said data is received from said source at a first data rate.

3. The method of claim 2, wherein said controller memory is capable of storing said data at a second data rate, wherein said first data rate is greater than said second data rate.

4. The method of claim 3, wherein said data is provided to said data consumer at a third data rate, wherein said third data rate is greater than said second data rate.

5. The method of claim 1, wherein said steps of compressing said data and decompressing said data are performed by an application specific integrated circuit (ASIC).

6. The method of claim 1, wherein said steps of compressing said data and decompressing said data are performed by at least one of microcode and firmware running on a programmable microprocessor.

7. The method of claim 5, wherein said controller memory is external to said application specific integrated circuit.

8. The method of claim 5, wherein said controller memory is internal to said application specific integrated circuit.

9. The method of claim 1, further comprising decompressing said compressed data from said controller memory to a temporary buffer in response to receiving a request for random access to said compressed data.

10. The method of claim 1, further comprising:
    receiving additional data;
    determining whether said additional data is capable of compression; and
    storing at least a portion of said additional data in said controller memory without first compressing said additional data if said data cannot be compressed.

11. The method of claim 1, wherein said data source comprises at least one of a host system memory, a host processor, and a peripheral device.

12. The method of claim 1, wherein said data consumer comprises at least one of said host system memory, a host processor, and a peripheral device.

13. The method of claim 1, wherein said data is received from said source by at least one of a first interface and a second interface, and wherein said data is provided to said data consumer by at least one of said first interface and said second interface.

14. The method of claim 1, wherein said data is received from said source by a first interface, and wherein said data is provided to said data consumer by a second interface.

15. A method, usable in a computer system having host system memory, for increasing disk drive controller data throughput, said disk drive controller including controller memory, the method comprising:

receiving uncompressed first data at a first interface;

compressing said uncompressed first data to form compressed first data;

writing said compressed first data to controller memory, said controller memory being different from said host system memory, wherein said controller memory is one of SDRAM, DRAM, SRAM or RAM;

reading said compressed first data from said controller memory;

uncompressing said compressed first data to recover said uncompressed first data; and providing said uncompressed first data to at least one of said first interface and a second interface.

16. The method of claim 15, wherein said first and second interfaces are capable of passing data at a first data rate, wherein said controller memory is capable of receiving data at a second data rate, and wherein said first data rate is greater than said second data rate.

17. The method of claim 15, wherein said first interface is interconnected to a host system bus, and wherein said step of receiving uncompressed first data at said first interface comprises receiving uncompressed data from a data source comprising at least one of said host system memory, a host system processor interconnected to said host system bus, and a peripheral device.

18. The method of claim 15, wherein said second interface comprises a channel of a storage device, and further comprising providing said uncompressed first data from said second interface to said storage device.

19. The method of claim 18, wherein said storage device comprises at least one of a hard disk drive, a tape drive, an optical drive, and a three-dimensional storage device.

20. The method of claim 15, further comprising:

receiving uncompressed second data at said second interface;

compressing said uncompressed second data to form compressed second data;

writing said compressed second data to said controller memory;

reading said compressed second data from said controller memory;

uncompressing said compressed second data to recover said uncompressed second data; and providing said uncompressed second data to at least one of said first interface and said second interface.

21. The method of claim 15, wherein said step of compressing said uncompressed first data comprises compressing said uncompressed first data while said uncompressed first data is written to said controller memory.

22. The method of claim 20, wherein said step of compressing said uncompressed second data comprises compressing said uncompressed second data while said uncompressed second data is written to said controller memory.

23. The method of claim 15, further comprising:

receiving uncompressed second data at a first interface;

performing a compression routine with respect to at least a first portion of said second data, wherein said compression routine expands said second data;

writing at least a second portion of said second data to said controller memory without performing said compression routine with respect to said at least said second portion of said second data.

24. The method of claim 15, wherein said second portion of said second data comprises substantially all of said second data.

25. The method of claim 15, wherein said second portion comprises all of said second data.

26. The method of claim 23, further comprising:

reading said second data from said memory;

decompressing said at least a second portion of said second data; and providing said second data to at least one of said first interface and said second interface.

27. A memory controller having controller memory, usable in a computer system having host system memory, comprising:

a first interface having a first data bandwidth;

a second interface having a second data bandwidth;

data compression circuitry;

said controller memory having a third data bandwidth; and data decompression circuitry, wherein first data received at said first interface is compressed by said data compression circuitry for storage in said controller memory, wherein said controller memory is one of SDRAM, DRAM, SRAM or RAM, and wherein said first data read from said controller memory is decompressed by said data decompression circuitry prior to being provided to at least one of said first interface and said second interface.

28. The memory controller of claim 27, wherein said first data bandwidth plus said second data bandwidth is greater than said third data bandwidth.

29. The memory controller of claim 27, wherein said data compression circuitry and said data decompression circuitry has a fourth data bandwidth, and wherein said fourth data bandwidth is greater than said third data bandwidth.

30. The memory controller of claim 27, wherein at least one of said data compression circuitry and said data decompression circuitry comprise an application specific integrated circuit.

31. The memory controller of claim 30, wherein said controller memory is external to said application specific integrated circuit.

32. The memory controller of claim 30, wherein said controller memory is internal to said application specific integrated circuit.

33. The memory controller of claim 27, wherein said first interface is interconnected to a host computer.

34. The memory controller of claim 27, wherein said second interface is interconnected to at least a first data storage device.

35. The memory controller of claim 34, wherein said at least a first data storage device comprises a hard disk drive.

36. The memory controller of claim 27, wherein said memory controller is implemented within a controller of a data storage device.

37. The memory controller of claim 36, wherein said data storage device comprises a hard disk drive.

38. The memory controller of claim 27, wherein at least a first portion of second data received at said first interface is expanded by said data compression circuitry, and wherein at least a second portion of said second data is stored in said controller memory in uncompressed form.

39. A method for providing a memory controller for a hard disk drive, comprising:

receiving first data at one of a first interface and a second interface;

compressing said first data;

after said step of compressing said first data, writing said compressed first data to memory;

reading said compressed first data from memory;

after said step of reading said first data, decompressing said compressed data;

providing said uncompressed first data to at least one of said first interface and said second interface;

receiving second data at one of said first interface and said second interface;

compressing at least a first portion of said second data, wherein said step of compressing results in an expansion of said data;

after said step of compressing at least a first portion of said second data, writing at least a second portion of said second data to said memory without compressing said at least a second portion of said second data;

providing said at least a second portion of said second data to at least one of said first interface and said second interface.

40. The method of claim 39, further comprising:

setting a first compression flag to signal that said first data has been compressed.

41. The method of claim 39, wherein said second interface comprises a channel of a peripheral device.

42. The method of claim 39, further comprising:

performing a CRC operation on said first data;

providing at least one of a parity value and an error correction code to said at least one of said first interface and said second interface.

43. The method of claim 39 wherein said step of writing said compressed first data to memory comprises writing said compressed first data to one of SDRAM, DRAM, SRAM or RAM.

* * * * *